Nov. 22, 1932.    D. TROMPETER    1,888,562
METHOD AND APPARATUS FOR MANUFACTURING PIES
Filed Oct. 2, 1931
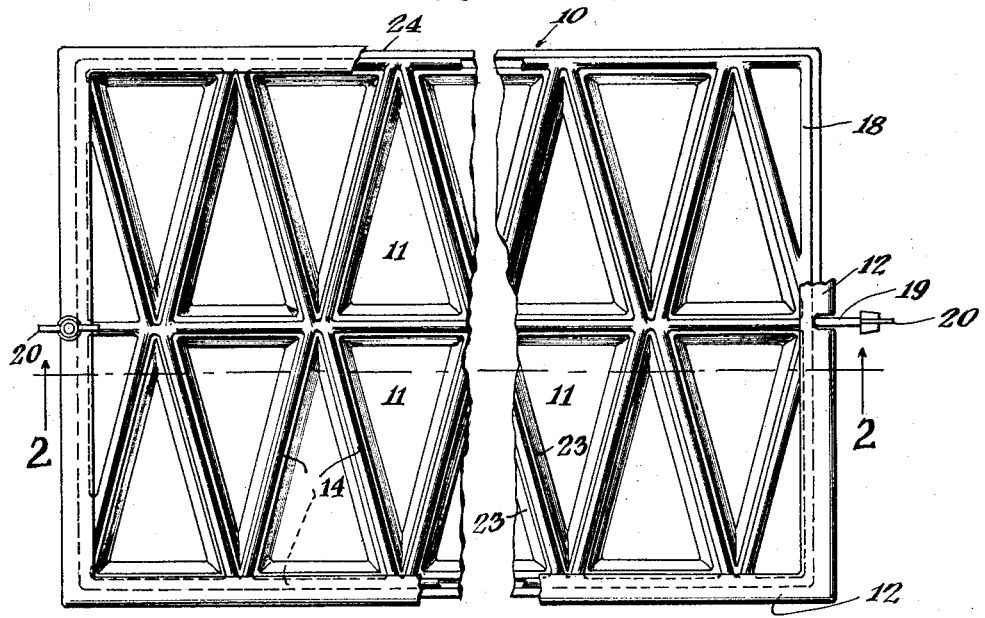
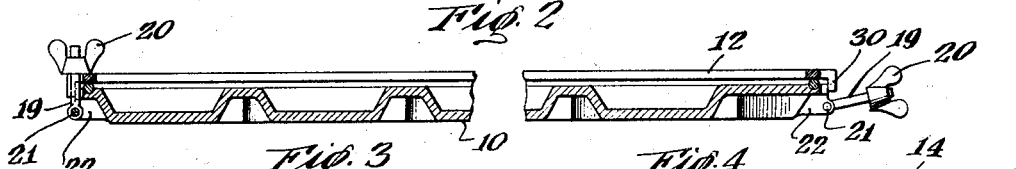
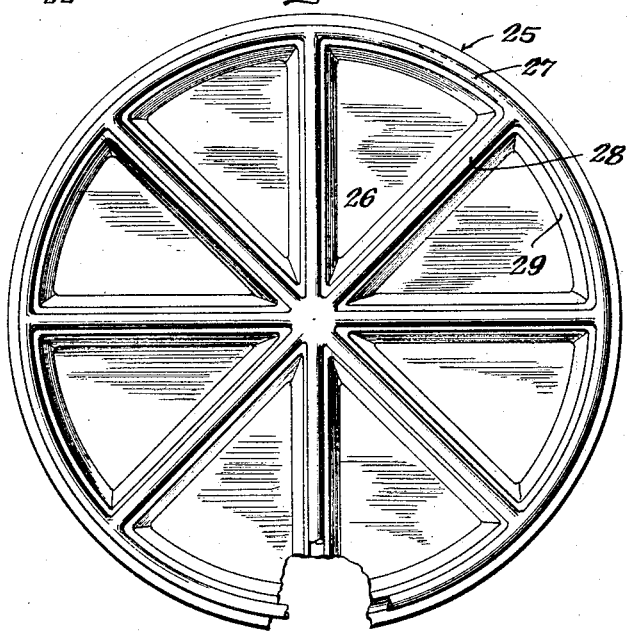
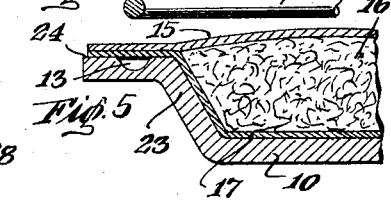
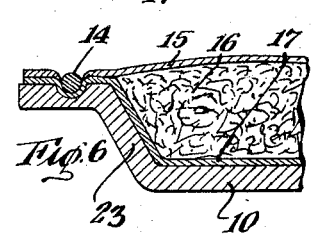
INVENTOR
David Trompeter
BY
*Charles A. Morton*
ATTORNEY Patented Nov. 22, 1932

1,888,562

UNITED STATES PATENT OFFICE

DAVID TROMPETER, OF BALDWIN, NEW YORK, ASSIGNOR TO TRI PIE CORPORATION, OF BROOKLYN, NEW YORK, A CORPORATION OF DELAWARE

METHOD AND APPARATUS FOR MANUFACTURING PIES

Application filed October 2, 1931. Serial No. 566,471.

This invention relates to a method of and apparatus for manufacturing sector shaped sealed pies of the individual portion to a customer type.

One object of this invention is to reduce the cost of production to a minimum.

Another object is a simple method employing inexpensive apparatus.

In accordance with this invention the pies are prepared in a multi-receptacle pie tin or mold, and an open framework of wires defining a plurality of sector shaped areas equal in number to the number of receptacles in the mold is then placed upon the top of the mold and forced downwards into the soft dough the partition walls and wire framework co-acting to demark and partially separate the pies; the mold with the wire framework secured in place thereon is now placed in the baking oven and the pies are baked and the wire framework is thereafter removed from the mold.

In the drawing comprising but a single sheet of six figures numbered Figures 1 to 6 inclusive suggested embodiments of the invention are set forth.

Figure 1 is a plan view of a large multi-receptacle mold looking from above with certain of the parts partially broken away;

Figure 2 is a vertical section of the mold taken along the line 2—2 of Figure 1 looking in the direction of the arrows;

Figure 3 is a plan view of a circular multi-receptacle pie pan looking from above with certain of the parts partially broken away;

Figures 4, 5 and 6 are detailed views.

Like reference characters designate corresponding parts throughout the several figures of the drawing.

The mold or pie tin may be made of any preferred shape and may be provided with a large group of sector or substantially sector shaped receptacles. In Fig. 1 the mold 10 is assumed to be rectangular and provided with a large number of receptacles 11. The mold might well contain 100 or more receptacles 11. The partition walls 23 are preferably inclined or bevelled as indicated in Figs. 2, 5 and 6, but the upper faces of said walls 24 are flat and all lie in the same horizontal plane. A groove or recess 13 is formed in each of the walls 24, said grooves defining a network of triangular or sector shaped guideways. The groove 13 may be semi-circular or angular as preferred. In the drawing it is shown semi-circular.

A framework 18 conforming in size and configuration to the size and configuration of the network of guideways is made of wire 14 of suitable gauge so as to lie in the grooves 13. Means may if desired be provided for locking the framework 18 relative to mold 10. Such means may be of any preferred form, but in the drawing a metal frame 12 having a downwardly projecting flange 30 adapted to frictionally engage the side wall of the mold is provided. Frame 12 is provided with suitable openings for receiving the clamps 19 and thumb screws 20, the former pivotally secured at 21 to suitable ears or lugs 22 formed on the lower wall of the mold 10.

In operating the mold a large sheet of dough 17 forming the bottom crust is first placed over the entire mold to overhang the side walls of the mold. This sheet of dough is then forced against the bottom and side walls of the various receptacles 11 by means of a matrix of the type disclosed broadly in my former application Serial No. 539,169 filed May 22, 1931. The sweetmeat 16 is now inserted in the receptacles 11 and it should be understood that because of the large size of the mold, the sweetmeat may be quickly pushed into the receptacles 11, by means of a stick or other device passed quickly across the top of the mold. One large layer of top crust dough 15 is now placed over the mold to completely cover it and overhang the side walls. The wire framework 18 is now placed over the mold and pressed downwards to depress the dough in the network of guideways by the co-action of the grooves 13 and wires 14. The wires 14 pressing upon the dough layers 15 and 17 tend to thin the dough in the recesses 13, and to seal the layers 15 and 17 together.

Frame 12 may now be placed over the wire framework 18 and locked by inserting clamps 19 and tightening butterfly screws 20 upon frame 12. The entire unit of 100 or more pies is now baked, and during the baking operation the upper crust 15 will rise upwards against the wires 14 of framework 18 so that after the entire unit is baked and the framework 18 removed, the pies each completey sealed in its own individual shell of pie crust may be readily and quickly separated by a breaking operation.

Figure 3 illustrates the invention applied to a standard circular pie plate 25 with sector shaped recesses 26 and bevelled walls 29. The framework consists of the intersecting radially disposed wires 28 secured like spokes to the annular frame 27. The method of operation is as previously described for mold 10 and the resulting product a sector shaped individual pie portion entirely sealed in a shell of pie crust, with the crown of the pie 15 rising substantially above the level of the sealed peripheral edges where the upper and lower layers of dough 15 and 17 were united by the action of the framework 27 and wires 28.

One very important advantage of using a mold with flush top walls 24 is that such a mold can be readily cleaned. This is a distinct advantage because dry dough or pie crust when lodged in an angle or corner is not readily removed and a plate or mold that eliminates corners by avoiding the use of all upwardly extending beads or flanges is more readily cleaned ready for re-use.

The mold 10 or 25 and wire framework 18 or 27 may be designed to cause the wires 14 to cut or partially sever the layers of dough 15 and 17 by the pressure exerted by the wires 14 against the edges of the grooves 13. This may be accomplished in several ways; as by regulating the diameter of the wire 14 relative to that of the groove 13 to cause the wire to snugly fill the groove when the same contains the dough layers; or by designing the wire framework so that it will expand when heated to snugly fill the grooves 13; or by making the mold and framework of different metals having differing co-efficients of expansion so that the framework will expand more rapidly than the mold as by the use for example of an iron mold and an aluminum wire framework. In the event the wire framework is caused to snugly fill the grooves by the action of heat, the severance or partial severance of the layers of dough in the operation of sub-dividing or partially sub-dividing the pie will take place during the baking operation.

It should be understood that the mold 10 may be carried if desired upon a conveyor system from the point where the empty mold is first taken until the complete pie reaches the oven all ready for baking. The various steps of placing the sheets of dough and filler in place, may if preferred be carried out by suitable rolling and filling mechanism. The dough overhanging the sides of the mold may be shorn off by using suitable transversely and longitudinally operated mechanical cutting mechanism positioned at the appropriate point in the conveyor system (Fig. 5), before the framework 18 is brought into registry with mold 23 (Fig. 6).

What is claimed is:

1. The method of making individual triangular or sector shaped sealed pies having the cubical contents of the conventional sector shaped individual pie portion in quantity which consists in making one large pie in a mold or pie tin having a plurality of triangular or sector shaped recesses assembled together and separated by partition walls having flat top surfaces recessed to define a guideway network, compressing the upper and lower layers of dough together along the flat top surfaces of the partition walls to seal said layers together, stretching so much of the upper and lower layers of dough as overlies the guideway network to form a thin readily severable pie crust, and retaining the layers of dough compressed along the flat top surfaces and stretched in the recesses of said guideway network while the pie is baked as a single unit.

2. The method of making individual triangular or sector shaped sealed pies having the cubical contents of the conventional sector shaped individual pie portion in quantity which consists in making one large pie in a mold or pie tin having a plurality of triangular or sector shaped recesses assembled together and separated by partition walls having flat top surfaces recessed to define a guideway network, applying a wire framework conforming in configuration to the configuration of the flat topped surfaces and guideway to compress and seal the upper and lower layers of dough together and to partially separate said layers vertically in said guideway, and then baking said pie as a single unit while retaining said wire framework in place.

3. In a pie tin in combination a plurality of sector or triangular shaped recesses assembled together and separated by partition walls having flat top surfaces, grooves in the top surfaces of said partition walls and of the outside walls of the mold, said grooves defining a guideway network surrounding each of said recesses, and an open wire network conforming in configuration to the configuration of said guideway network the wires of the wire network being intended to lie in the grooves of the guideway network when the latter is brought into registry with the pie tin.

4. In a pie tin and in combination a plurality of sector or triangular shaped recesses assembled together and separated by partition walls having flat top surfaces, grooves in the top surfaces of said partition walls and of the outside walls of the mold, said grooves defining a guideway network surrounding each of said recesses, and an open wire network conforming in configuration to the configuration of said guideway network the wires of the wire network being made of a metal having a different co-efficient of expansion than the pie tin, said wire network being intended to lie in the grooves of the guideway network when the latter is brought into registry with the pie tin.

Signed at Brooklyn in the county of Kings and State of New York this 30th day of September A. D. 1931.

DAVID TROMPETER.